(12) United States Patent
Mottier et al.

(10) Patent No.: US 6,252,516 B1
(45) Date of Patent: Jun. 26, 2001

(54) RADIO WITH SILENT AND AUDIBLE ALERTS

(75) Inventors: Matthew D. Mottier, Palatine; Mike M. Albert, Chicago; Joshua P. Kiem, Park Ridge, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/220,949

(22) Filed: Mar. 31, 1994

Related U.S. Application Data

(63) Continuation of application No. 07/823,738, filed on Jan. 22, 1992, now abandoned.

(51) Int. Cl.[7] .................................................. G08B 5/22
(52) U.S. Cl. ........................................................ 340/825.44
(58) Field of Search ........................ 340/825.44, 825.46, 340/825.48; 455/38.2, 38.4, 38.5

(56) References Cited

U.S. PATENT DOCUMENTS

| | | |
|---|---|---|
| 3,911,416 | 10/1975 | Feder . |
| 4,237,448 | 12/1980 | Weinberg . |
| 4,536,761 * | 8/1985 | Tsunda ............................ 340/825.44 |
| 4,755,816 | 7/1988 | DeLuca . |
| 4,879,759 | 11/1989 | Matsumoto et al. . |
| 4,904,992 | 2/1990 | Grothause . |
| 4,918,438 * | 4/1990 | Yamasaki ........................ 340/825.48 |
| 5,172,092 * | 12/1992 | Nguyen ............................ 340/825.46 |

OTHER PUBLICATIONS

Motorola "PMR2000" series, GSC Alphanumeric Display Personal Message Receiver.
Motorola "PMR2000", Personal Message Receiver Golay Sequential Code.
Motorola Cellular Mobile Telephone, users manual No. 68P81156E19–0.
Cellular mobile and carry phone accessory, programming and installation manual No. 68P09354A76–0.

* cited by examiner

*Primary Examiner*—Brian Zimmerman
(74) *Attorney, Agent, or Firm*—Kevin D. Kaschke; Roland K. Bowler, II

(57) ABSTRACT

An alerting device, such as a radio (10), activates, responsive to the times when an information signal (12) is received, a silent alert, via a vibrator (24), during a first predetermined time period, and an audible alert, via a loudspeaker (22), during a second predetermined time period, exclusive of the first predetermined time period. A radio user can configure the priority and the duration of the silent and audible alerts. The radio (10) also detects the reception of the information signal and the intercoupling between an accessory 51 to the radio 10. Responsive to the detection thereof, the radio (10) activates the audible alert. Thus, the user gains a high degree of confidence that the radio (10) will activate the proper alert in situations having a wide range of ambient noise levels and distances of the radio relative to the user's body.

6 Claims, 3 Drawing Sheets

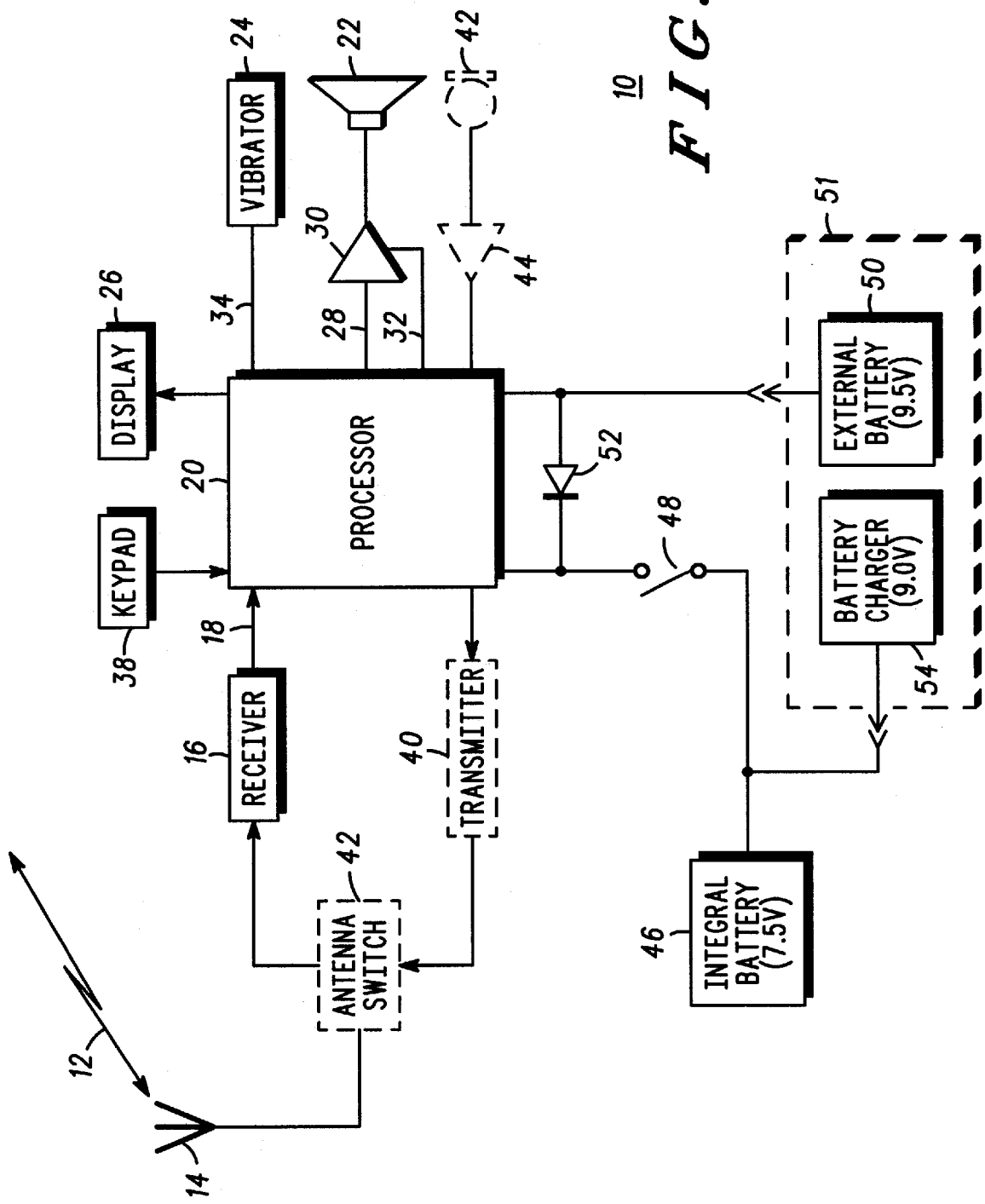

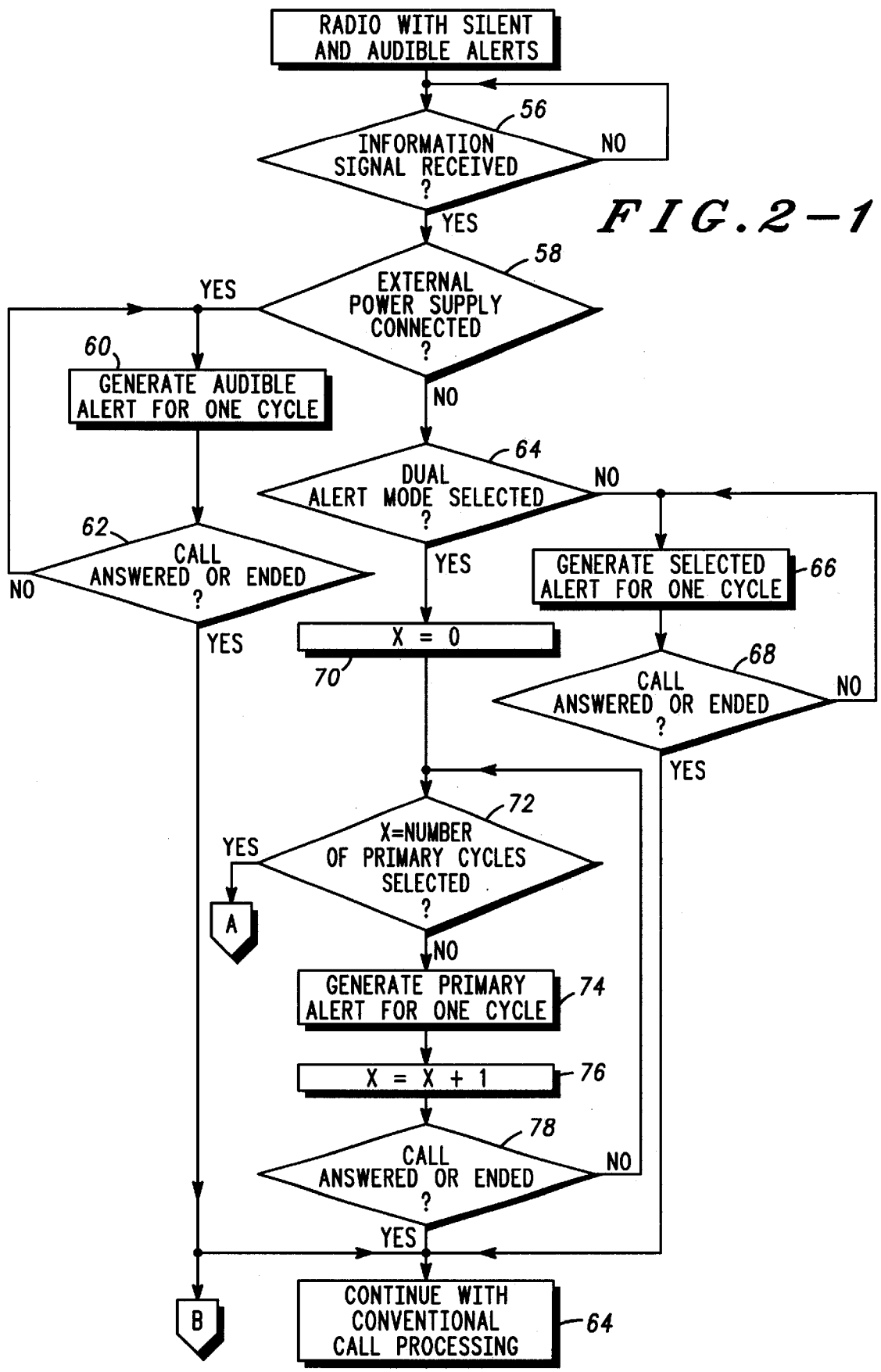

RADIO WITH SILENT AND AUDIBLE ALERTS

This is a continuation of application Ser. No. 07/823,738, filed Jan. 22, 1992 and now abandoned.

FIELD OF THE INVENTION

The present invention relates generally to radios, including but not limited to radios alerting a user of the radio that a call has been received.

BACKGROUND OF THE INVENTION

In many applications radio devices alert a user of the device when a call has been received. Such devices generally produce an audible alerting signal which can be heard by the user. However, an audible signal may produce a disturbance in some places where there is a low ambient noise level, and may not be heard in other places where there is a high ambient noise level. A manual sound level control can be provided to change the level of the sound for different situations. However, such a manual control is objectionable as the level control may be set to a level such that the audible alerting signal produces a disturbance or is not heard.

To eliminate the use of an audible alerting signal in places where this is objectionable, some radio devices use a silent alert signal, such as that produced by a vibrating device, so that the user of the radio device feels, rather than hears, the alerting signal. This is objectionable as it is only effective when the radio device is worn on the body of the user.

Some radio devices may provide both an audible and a silent alert. A manual control can be provided to alternatively select between the audible alert and the silent alert for different situations. However, such a control is objectionable as the user may forget that the audible alert was selected so the audible alert signal produces a disturbance or is not heard, or the user may forget that the silent alert was selected so the silent alert goes undetected to the user when the radio device is not worn on the body of the user.

Accordingly, there is a need to insure that the user of a radio device will be alerted when a call has been received in a wide range of ambient noise levels and distances of the radio device relative to the user's body.

BRIEF DESCRIPTION OF THE DRAWINGS

FIG. 1 is a block diagram of a radio.

FIG. 2-1 and 2-2 illustrate a decision flow diagram executed by the radio of FIG. 1.

DETAILED DESCRIPTION OF A PREFERRED EMBODIMENT

Figure 2:
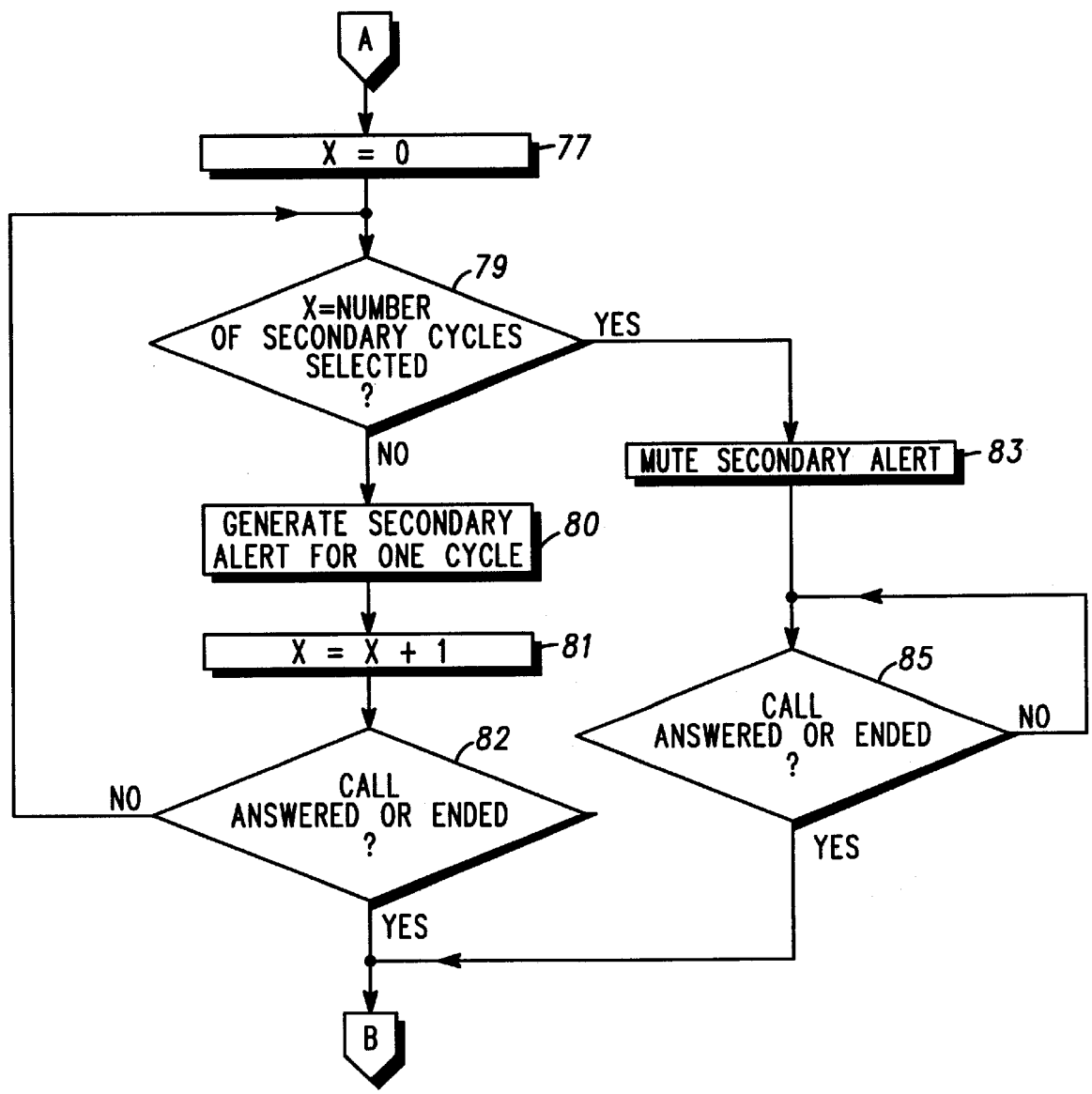

FIG. 1 illustrates a block diagram of a wireless communication device, such as a radio 10, constructed in accordance with the present invention. For the radio 10 to receive a call, a radio frequency information signal 12 is coupled from an antenna 14 to a receiver 16. The receiver 16 may be of conventional design and may operate at a radio frequency in a range of radio frequencies used for this purpose. The receiver 16 provides a received signal at line 18 to a processor 20 at times when the information signal 12 has been received. The processor 20 responds to the received signal at line 18 to alert a user of the radio that a call has been received.

The radio 10 alerts the user that a call has been received in a variety of ways depending upon the optional alert features enabled or disabled by the user. The processor 20 may alert the user via an audible alert device, such as a loudspeaker 22, or a silent alert device, such as a vibrator 24. To alert the user via the loudspeaker 22, the processor 20 produces an audible alert signal at line 28 to activate the loudspeaker 22 via an amplifier 30. The processor 20 may enable or disable the amplifier 30 via an audible alert control signal at line 32. To alert the user via the vibrator 24, the processor 20 produces a silent alert signal at line 34 to activate the vibrator 24. A display 26 is coupled to the processor 20 to accept data messages after the user acknowledges the alert or if the user is not able to acknowledge the alert. An input device, such as a keypad 38, may be used by the user to select the preferred type of alert.

Optionally, the present invention can be incorporated into a two-way radio by including a transmitter 40 and an antenna switch to selectively couple the antenna 14 to either the receiver 16 or the transmitter 40. In this way, voice and data messages may be provided to the transmitter 40 from the processor 20 to be broadcast from the radio 10. Voice messages may be provided to the processor 20 from a microphone 42 via an input amplifier 44.

Power is typically supplied to the radio 10 via an integral power supply, such as an integral battery 46, so the radio 10 may be conveniently carried by the user. In some situations the radio 10 may not be carried by the user, such as when the radio 10 is electrically or mechanically intercoupled with an accessory to the radio, such as an external power supply 51 or a radio holder (not shown). The integral battery 46 is electrically coupled to the processor 20 via a switch 48. In some situations the external power supply 51, may be used to power the radio 10. Two examples of external power supplies 51 may include an external battery 50 and a battery charger 54. The radio 10 can detect the external power supply 51 in a variety of ways.

One way the radio 10 detects the external power supply 51 is by comparing the voltage supplied by the external power supply 51 against the maximum voltage supplied by the integral battery 46. For example, the maximum voltage of the integral battery 46 is 7.5 V, and the typical voltage of the external battery 50 and the battery charger 54 is 9.5 V and 9.0 V, respectively. Thus, when the radio 10 detects a typical voltage of the external power supply 51 (9.5 V or 9.0 V) greater than the maximum voltage of the integral battery 46 (7.5 V), the presence of the external power supply 51 is detected.

As a two-way radio, the radio 10 may be used with the integral battery 46 as a portable radio or may be used in conjunction with the external battery 50, such as a mobile vehicle battery, as a mobile radio. Thus, a radio user may conserve the life of the integral battery 46 while operating the radio 10 as a mobile radio. The external battery 50 is electrically coupled to the processor 20 directly and via a forward biased diode 52. When the external battery 50 is electrically coupled to the radio 10, a switch 48 is open circuited to decouple the integral battery 46 and the radio 10. When the external battery 50 is not electrically coupled to the radio 10, the switch 48 is short circuited to electrically couple the integral battery 46 to the radio 10.

When the power available to the radio 10 from the integral battery 46 is low, the battery charger 54 may be electrically coupled to the radio 10 in parallel with the integral battery 46 to charge the integral battery 46 while the integral battery 46 is electrically coupled to the radio 10. The radio 10 can receive calls when the radio 10 is electrically coupled to the battery charger 54.

Conventional radios can provide a manual control to alternatively select between the audible alert and silent alert to alert the user in most situations. For example, if the radio 10 is worn on the body of the user and the user is in a quiet environment where the audible alert could disturb others or in a loud environment where the audible alert could not be heard, the user would select the silent vibratory alert. Furthermore, when the user is in situations where wearing the radio 10 is not desirable, such as when swimming, charging the integral battery 46, or coupled to an external battery 50, the user would select the audible alert. However, there are some situations when the selected alert would be improper if the user does not remember to manually change the selected alert.

The present invention contemplates that the radio 10 may be used in a variety of situations having a wide range of ambient noise levels and radio distances relative to the user's body. For example, the user has selected the silent alert so as not to disturb others in a meeting and then intercouples the radio 10 with the accessory to the radio 10, such as the external power supply 51 without manually selecting the audible alert. A call received by the radio 10 while coupled to the external power supply 51 is likely to go undetected to the user since the radio 10 would not be on the body of the user. As another example, if the user has selected the audible alert while wearing the radio 10 and then moves to a noisy environment, a call received by the radio 10 in the noisy environment may go undetected to the user. Generally, conventional radios require the user to manually update the alert selection as the situation changes. Other examples of an improper alert activated by the radio 10 may be readily perceived by the reader.

According to the present invention, the radio 10 activates the silent alert during a first predetermined time period and the audible alert during a second predetermined time period at times when the information signal 12 is received. The first and the second time period are exclusive of each other so that both the silent and audible alerts are not activated at the same time, thus increasing power drain from the integral battery 46. According to the present invention from another perspective, the radio 10 switches between the activation of the silent alert and the audible alert, responsive to an elapsed predetermined time period during times when the information signal 12 is received. One alert type is activated until the predetermined time period has elapsed, then the other alert type is activated.

The present invention allows the user to configure the radio 10, via the keypad 38, to activate the alert in a variety of ways. The duration of the first and the second predetermined time periods may be varied. The silent and audible alert may comprise a continuous alert or a periodic alert (i.e. alert cycles). Either the silent or the audible alert may be selected as the primary alert that is activated first when a call is received. For example, the user can configure the radio 10 to activate the silent alert for two cycles then switch to the audible alert until the user answers the call or until the system in which the radio 10 operates stops sending the information signal 12 (i.e. ending the call). A primary advantage of the present invention is that the radio 10 may alert the user in a variety of situations having a wide range of ambient noise levels and distances of the radio 10 relative to the user's body. Thus, the user gains a high degree of confidence that a call will not be missed because the alert type was not changed when the situation changed.

According to the present invention, the radio 10 can also detect when the accessory to the radio 10, such as the external power supply 51 or the holder (not shown) is electrically or mechanically intercoupled, respectively, with the radio 10. Upon detection, the radio 10 will activate an audible alert at times when the information signal 12 is received even if the silent alert was selected by the user. After the external power supply 51 is decoupled from the radio 10, the silent alert may again be activated by the radio 10 when the information signal 12 is received. The radio 10 activates the audible alert when the silent alert was selected so the user does not have to remember to manually switch to the audible alert. Here again, the user gains a high degree of confidence that a call will not be missed because the alert type was not changed when the situation has changed.

FIG. 2-1 and 2-2 illustrate a decision flow diagram executed in the radio 10 of FIG. 1. A conventional timer (not shown) associated with the processor 20 regulates the rate at which the decisions are executed. At block 56, a decision is made to determine if the information signal 12 has been received. If the information signal 12 has not been received, no action is taken. If the information signal 12 has been received, a decision is made at block 58 to determine if the accessory to the radio 10, such as the external power supply 51, is electrically coupled to the radio 10. If the external power supply 51 is coupled to the radio 10, the radio 10 operates in a unique manner by activating an audible alert at block 60 regardless if the silent alert was selected by the user until the call is answered or ended at decision block 62. Upon answering or ending the call at decision block 62, the radio 10 continues with conventional call processing at block 64. Thus, user will advantageously receive an audible alert when the radio 10 is intercoupled to the accessory to the radio 10 regardless if the silent alert was selected.

If, at decision block 58, the external power supply 51 is not coupled to the radio 10, a decision is made at block 64 to determine if the radio 10 is configured to alternatively select between the activation of the silent alert and the audible alert. If the decision is negative, the radio 10 operates in a conventional manner by activating the selected alert at block 66 until the the call is answered or ended at decision block 68. Upon answering or ending the call, the radio 10 continues with conventional call processing at block 64.

If, at decision block 64, the decision is positive, the radio 10 operates in a novel manner. The radio 10 alerts the user to an received information signal 12 by activating a primary alert for a first predetermined number of cycles, and then activates a secondary alert for a second predetermined number of cycles or until the call is answered or ended. The primary alert represents the alert type selected for activation by the radio 10 first, and then followed by the secondary alert selected for activation by the radio 10. Thus, the user may configure the radio 10 to activate the silent alert followed by the audible alert, or the audible alert followed by the silent alert.

A counter variable, X, representing the number of alert cycles activated by the primary or secondary alert, is initialized to zero at block 70. At decision block 72, a decision is made if the number of alert cycles activated by the primary alert is equal to the number of primary alert cycles desired by the user before activating the secondary alert. If the decision at block 72 is negative, one primary alert cycle is activated at block 74 and the counter variable, X, is incremented at block 76. At block 78, a decision is made to determine if the call was answered or ended. If the decision is positive, the radio 10 continues with conventional call processing at block 64. If the decision is negative, the decision flow continues to block 72 to again compare number of alert cycles activated by the primary alert to the number of primary alert cycles desired by the user before activating the secondary alert. Thus, the radio 10 will activate the primary alert for a user specified number of cycles until the call is answered, ended or the number of cycles predetermined by the user has elapsed.

After the radio 10 has activated the predetermined number of alert cycles, the radio 10 then reinitializes the counter variable, X, to zero at block 77 to begin counting the secondary alert cycles. At decision block 79, a decision is made if the number of alert cycles activated by the secondary alert is equal to the number of secondary alert cycles desired by the user before muting the secondary alert. If the decision is positive at block 79, the secondary alert is muted at block 83. While the secondary alert is muted, the call remains active until the call is answered or ended at block 85. Muting the secondary alert after a predetermined number of cycles offers at least one advantage. For example, the primary silent alert may be activated for two cycles and then the secondary audible alert for only one cycle. Only one secondary audible alert cycle would be enough to alert a user to a call if the radio 10 was not on the user's body, but not overly disturbing to others if the call could not be answered immediately. When the call is answered or ended at block 85, conventional call processing continues at block 64.

If the decision is negative at block 79, the secondary alert is activated for one cycle at block 80 and the counter variable, X, is incremented at block 81. At block 82, a decision is made to determine if the call was answered or ended. If the decision is positive, the radio 10 continues with conventional call processing at block 64. If the decision is negative, the decision flow continues to block 79 to again compare number of alert cycles activated by the secondary alert to the number of secondary alert cycles desired by the user before muting the secondary alert. Thus, the radio 10 will activate the secondary alert for a user specified number of cycles until the call is answered, ended or the number of cycles predetermined by the user has elapsed wherein the secondary alert is muted.

Therefore, the user no longer needs to remember whether the silent alert or the audible alert was selected when a call has been received. A radio 10 activates silent and audible alerts, one at a time, at times when a call is received, and has audible alert priority over a preselected silent alert when the radio is intercoupled with an accessory to the radio 10. This radio feature gives the user a high degree of confidence that a call will be received in situations having a wide range of ambient noise and distances of the radio relative to the user's body.

What is claimed is:

1. A radio capable of being coupled to an accessory, the radio comprising:
    a receiver for receiving a valid information signal;
    a silent alert generator for indicating the reception of the valid information signal when the silent alert generator is enabled and activated;
    an audible alert generator for indicating the reception of the valid information signal when the audible alert generator is enabled and activated; and
    a processor for:
        determining whether or not the radio is coupled to the accessory,
    when the radio is determined not to be coupled to the accessory,
        activating one of the silent alert generator and the audible alert generator during a first predetermined time period responsive to the reception of the valid information signal and responsive to the one of the silent alert and the audible alert generator being enabled, and
        automatically activating the other one of the silent alert generator and the audible alert generator during a second predetermined time period exclusive of the first predetermined time period responsive to the reception of the valid information signal and responsive to the other one of the silent alert and the audible alert generator being enabled, and
    when the radio is determined to be coupled to the accessory,
        enabling the audible alert generator, when disabled, and
        activating the audible alert generator during both the first and the second predetermined time periods responsive to the reception of the valid information signal and responsive to the audible alert generator being enabled.

2. A radio in accordance with claim 1 wherein the accessory further comprises an external power supply.

3. A method of operating a radio capable of being coupled to an accessory, the method comprising the steps of:
    receiving a valid information signal;
    determining whether or not the radio is coupled to the accessory,
    when the radio is determined not to be coupled to the accessory,
        activating one of a silent alert generator and an audible alert generator during a first predetermined time period responsive to the reception of the valid information signal and responsive to the one of the silent alert and the audible alert generator being enabled, and
        automatically activating the other one of the silent alert generator and the audible alert generator during a second predetermined time period exclusive of the first predetermined time period responsive to the reception of the valid information signal and responsive to the other one of the silent alert and the audible alert generator being enabled, and
    when the radio is determined to be coupled to the accessory,
        enabling the audible alert generator, when disabled, and
        activating the audible alert during both the first and the second predetermined time periods responsive to the reception of the valid information signal and responsive to the audible alert generator being enabled.

4. A radio for communicating radio frequency (RF) signals comprising:
    an antenna for receiving an RF signal;
    a receiver coupled to the antenna for receiving the RF signal;
    a first generator for generating a silent alert when the first generator is enabled and activated;
    a second generator for generating a audible alert when the second generator is enabled and activated; and
    a processor, coupled to the receiver, for:
        determining whether or not the radio is coupled to the accessory,
    when the radio is determined not to be coupled to the accessory,
        activating the first generator for a first period of time when the RF signal is received and when the first generator is enabled, and
        activating the second generator for a second period of time after expiration of the first period of time when the RF signal is received and when the second generator is enabled, and when the radio is determined to be coupled to the accessory,
  enabling the second generator, when disabled, and
  activating the second generator when the RF signal is received and when the second generator is enabled.

5. A radio for communicating radio frequency (RF) signals comprising:
  an antenna for receiving an RF signal;
  a receiver coupled to the antenna for receiving the RF signal;
  a first generator for generating a vibrating alert when the first generator is enabled and activated;
  a second generator for generating a ringing alert when the second generator is enabled and activated; and
  a processor, coupled to the receiver, for:
    determining whether or not the radio is coupled to the accessory,
when the radio is determined not to be coupled to the accessory,
  activating the first generator for a first period of time when the RF signal is received and when the first generator is enabled, and
  activating the second generator for a second period of time after expiration of the first period of time when the RF signal is received and when the second generator is enabled, and
when the radio is determined to be coupled to the accessory
  enabling the audible alert generator, if disabled, and
  activating the second generator when the RF signal is received and when the second generator is enabled.

6. A radio for communicating radio frequency (RF) signals comprising:
  an antenna for receiving an RF signal;
  a receiver coupled to the antenna for receiving the RF signal;
  a first generator for generating a vibrating alert when the first generator is enabled and activated;
  a second generator for generating an audible ringing alert when the second generator is enabled and activated; and
  a processor, coupled to the receiver, for:
    determining whether or not the radio is coupled to the accessory,
when the radio is determined not to be coupled to the accessory,
  activating at least one of the first and second generators when the RF signal is received and when the one of the first and second generators is enabled, and
when the radio is determined to be coupled to the accessory,
  enabling the second generator, when disabled, and
  activating the second generator when the RF signal is received and when the second generator is enabled.

* * * * *